United States Patent [19]

Lasbleis

[11] Patent Number: 5,417,477
[45] Date of Patent: May 23, 1995

[54] METHOD OF CONTROLLING AN ELECTROHYDRAULIC BRAKING APPARATUS FOR AN AIRCRAFT WHEEL SET, AND AN APPARATUS FOR IMPLEMENTING SAID METHOD

[75] Inventor: Thierry Lasbleis, Clamart, France

[73] Assignee: Messier-Bugatti, Velizy Villacoublay, France

[21] Appl. No.: 187,913

[22] Filed: Jan. 28, 1994

[30] Foreign Application Priority Data

Feb. 1, 1993 [FR] France ................... 93 01042

[51] Int. Cl.⁶ .............................................. B60T 13/74
[52] U.S. Cl. ............................................ 303/3; 303/20; 303/9.61; 303/9.62; 303/111; 244/111
[58] Field of Search ................... 303/9.61, 9.62, 9.71, 303/3, 10, 15, 20, 7, 111, 113.5; 188/181 T, 264 R, 349; 244/110 A, 110 H, 111

[56] References Cited

U.S. PATENT DOCUMENTS

| 3,504,248 | 3/1970 | Miller | 318/18 |
| 4,006,941 | 2/1977 | DeVlieg | 244/111 X |
| 4,043,607 | 8/1977 | Signorelli et al. | 303/100 |
| 4,365,847 | 12/1982 | Martin | 303/93 |
| 4,404,633 | 9/1983 | Goicuechea | 303/93 X |
| 5,050,940 | 9/1991 | Bedford et al. | 244/111 X |
| 5,116,108 | 5/1992 | Sigl | 303/103 |
| 5,116,109 | 5/1992 | Kuwana et al. | 303/109 |
| 5,172,960 | 12/1992 | Chareire | 303/111 |
| 5,217,282 | 6/1993 | Guichard | 303/9.73 |

FOREIGN PATENT DOCUMENTS

| 2305775 | 10/1976 | European Pat. Off. |
| 0329373 | 8/1989 | European Pat. Off. |
| 0353506 | 2/1990 | European Pat. Off. |
| 0384071 | 8/1990 | European Pat. Off. |
| 0443213 | 8/1991 | European Pat. Off. |
| 0498714 | 8/1992 | European Pat. Off. |

Primary Examiner—Robert J. Oberleitner
Assistant Examiner—Lee W. Young
Attorney, Agent, or Firm—Sixbey, Friedman, Leedom & Ferguson; Gerald J. Ferguson, Jr.; Donald R. Studebaker

[57] ABSTRACT

The invention relates to controlling an electrohydraulic braking apparatus of a wheel set in which each wheel is fitted with a brake that is actuated from brake pedals by way of a servo-valve that is electrically controlled by a control unit which measures information relating to the degree of depression of the pedals. According to the invention, when an aircraft is taxiing, braking for the wheels in a first group is organized separately from braking for the wheels in a second group, applied braking pressure varying as a function of brake pedal depression in compliance with respective relationships specific to each of the groups of wheels, which relationships operate over the entire active range of brake pedal depression. One of the two relationships is a continuously increasing function that gives rise to braking torque from a low value of brake pedal depression, while the other relationship is a continuously increasing function that gives rise to braking torque only above a predetermined depression threshold of said pedals.

8 Claims, 3 Drawing Sheets

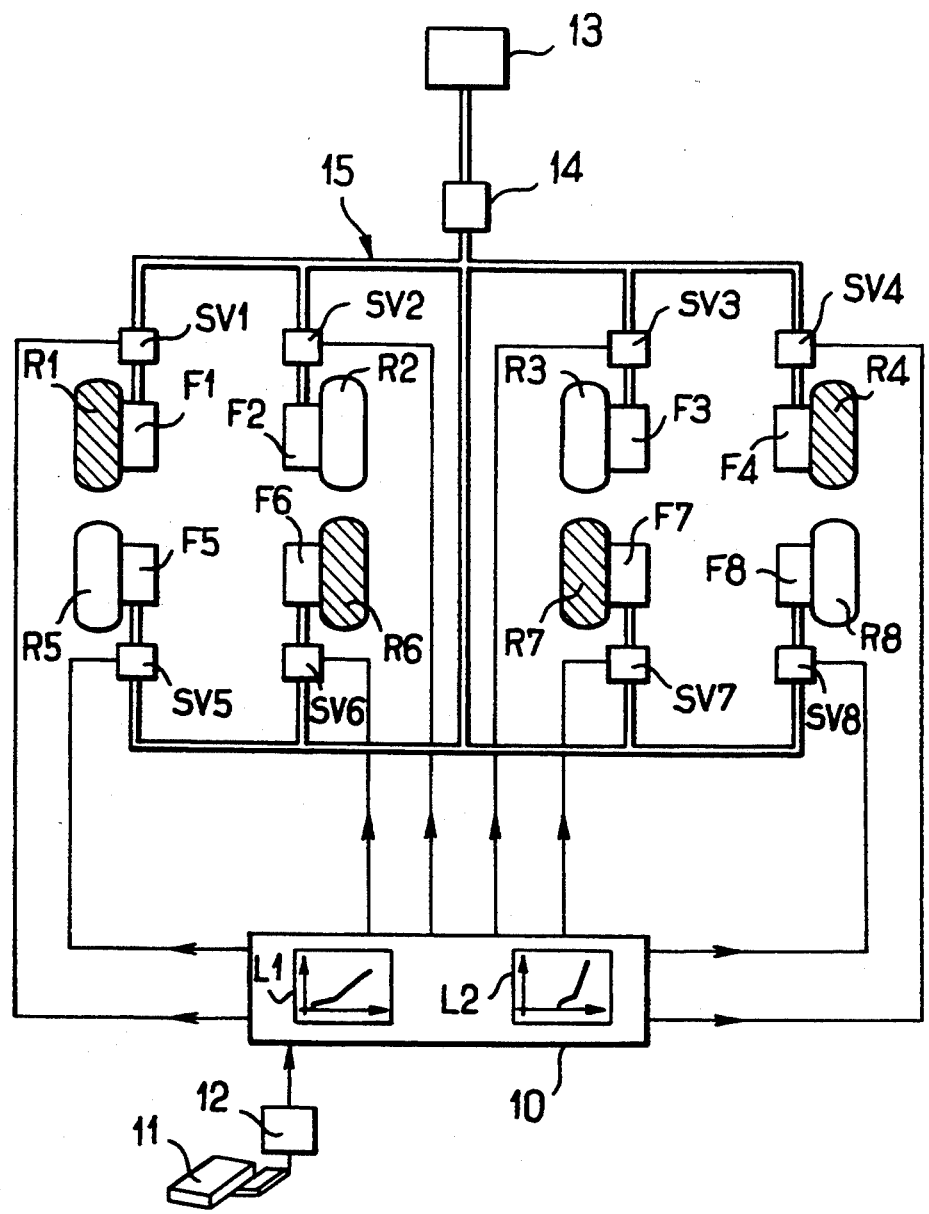
FIG_1

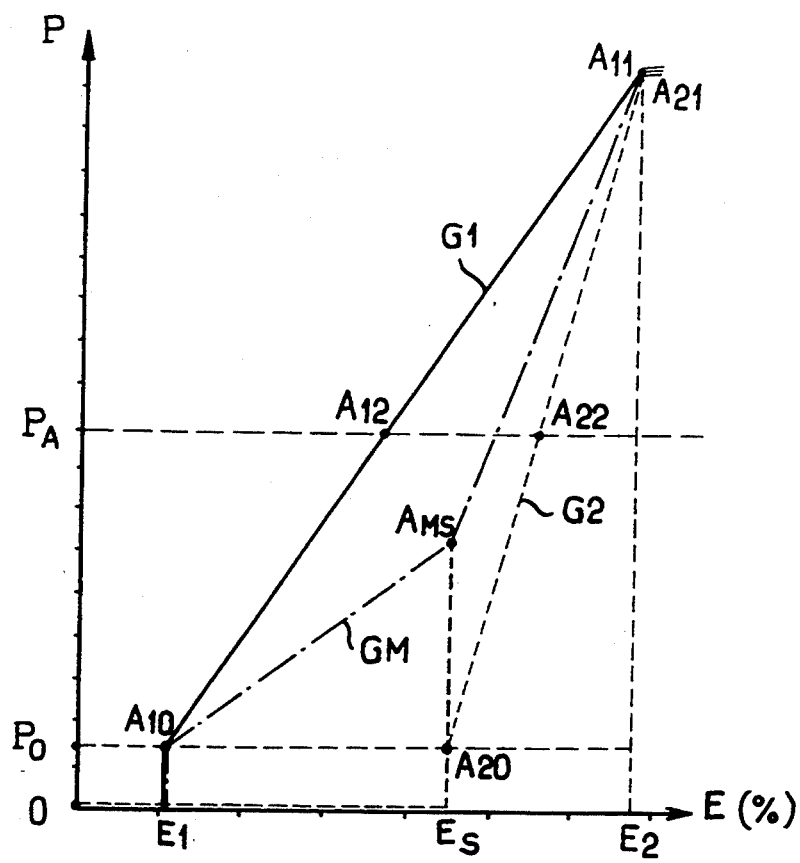
FIG_2
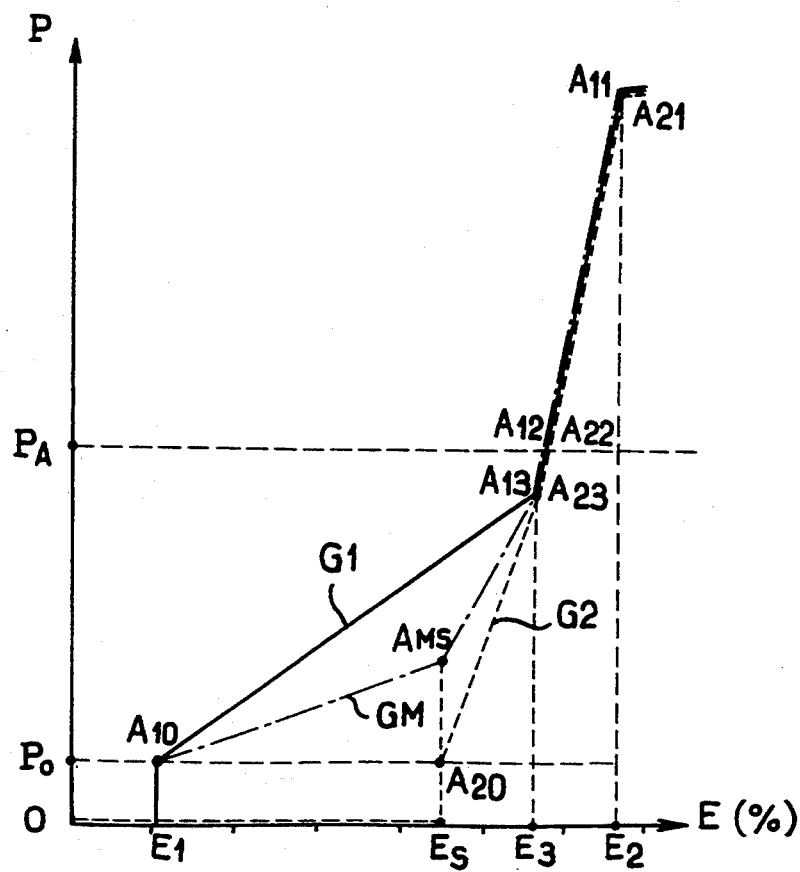
FIG_3

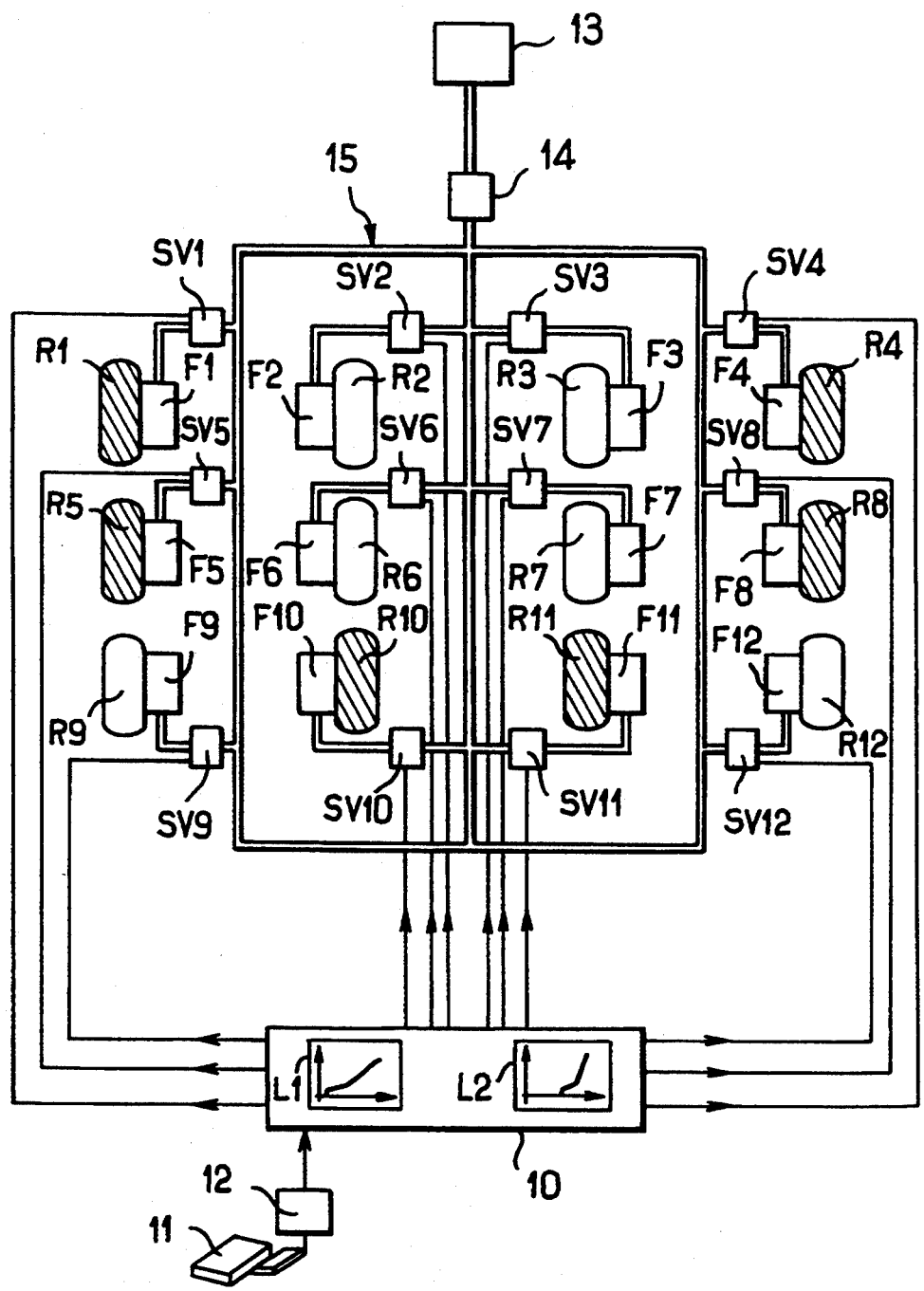
FIG_4

METHOD OF CONTROLLING AN ELECTROHYDRAULIC BRAKING APPARATUS FOR AN AIRCRAFT WHEEL SET, AND AN APPARATUS FOR IMPLEMENTING SAID METHOD

The present invention relates to controlled braking of an aircraft wheel set.

BACKGROUND OF THE INVENTION

Controlled braking of a wheel set may be distributed over the various wheel brakes, or it may be organized to alternate over various groups of brakes, in which case half of the brakes are actuated while the other half of the brakes are released. When an aircraft is taxiing, i.e. running on the ground while not taking off or landing, and generally at low speeds of less than 70 km/h to 80 km/h, it may be advantageous to actuate a fraction only of the wheel brakes in order to improve passenger comfort and/or reduce wear on carbon brakes, thus giving rise to braking that is smoother than when all of the brakes are actuated together. Different groups of brakes are then actuated in alternation so as to avoid some of the brakes becoming overheated relative to others.

In any event, regardless of whether braking is performed on all of the brakes or on a fraction of them only by alternating between groups of brakes, it is always desirable to optimize braking accuracy as much as possible, in particular at low speeds and when small amounts only of deceleration are required.

The problem of controllability when braking at low speed and at low deceleration is particularly severe for large-capacity aircraft since the brakes are so powerful that it is often difficult to achieve an accurate and repeatable relationship between brake pedal position and aircraft deceleration, but the better the pilot manages to control braking, the greater passenger comfort.

About 20 years ago, proposals were made to organize a system for controlling disk brakes by servo-controlling braking torque as a function of aircraft speed, e.g. by using two different servo-controlled relationships, as illustrated in U.S. Pat. No. 4,043,607. That type of system is not very satisfactory when it comes to providing braking that is repeatable and accurate for given depression of the brake pedals.

More precisely, as described in EP-A-0 329 373, proposals have been made to enable at least one of the brakes to be disabled or inhibited selectively, while taking care to avoid disturbing the directional stability of the aircraft. The technique used for disabling the brakes is an on/off technique as a function of applied pressure, and disabling is applicable only at small or moderate depressions of the brake pedals. As a result, the transition from a fractional braking mode (in which only some of the brakes are actuated) to nominal braking mode (in which all of the brakes are actuated) necessarily disturbs continuity of braking (where discontinuity in the pressure applied to the brakes can affect passenger comfort, in particular) and/or disturbs the repeatability of braking as a function of pedal depression (the discontinuity in the perceived braking sensation can make it difficult for the pilot to get a "feel" for how hard the brake pedals need to be pressed).

Reference may also be made to EP-A-0 384 071 in which a system is proposed that uses the same technique of disabling a group of brakes (the word used is "inhibiting"), with disabling taking place as a function of measured wheel speed.

The state of the art is also illustrated by document U.S. Pat. No. 5,217,282 in the name of the present Applicant, in which electrohydraulic braking is organized to alternate between symmetrically disposed groups of wheel brakes by measuring the instantaneous temperature of each group of brakes and by selecting the group of brakes to be applied as a function of the temperature measurements performed. The braking apparatus is then controlled by a control unit which measures information that corresponds to brake pedal depression and which applies electrical control to servo-valves that are used for actuating the brakes. That technique is effective in minimizing brake heating, but it does not make it possible significantly to improve braking accuracy of large aircraft.

The state of the art is also illustrated by document EP-A-0 443 213 in which it is also desired to increase the lifetime of carbon brakes, by measuring aircraft speed and braking intensity, and by comparing the measured values with predetermined maximum values, so as to relax one or more brakes whenever the two measured values are less than said maximum values. The braking apparatus used is of the hydro-mechanical type, where the pressure of fluid delivered to the brakes is controlled by an associated braking manifold, said pressure (which is the same for all of the brakes) itself being modulated upstream as a function of the extent to which the brake pedals are depressed.

With such an apparatus, braking alternation is organized by providing an electro-valve associated with each brake in a group of brakes and arranged to suppress a braking order as from a certain threshold in the modulated pressure, with braking of the other group of brakes being ensured by the anti-skid valves associated with the brakes, which valves are not under pilot control.

Techniques of that type still suffer from the drawback of producing a certain amount of discontinuity in the applied pressure on going through the threshold, since the braking system switches from braking by means of one of two groups to braking by means of both groups using an overall pressure that doubles on passing through said threshold, thus having a direct effect on the braking sensation as perceived by the pilot, who is thus required to move the brake pedals accordingly in order to preserve passenger comfort. The main drawback that stems therefrom relates to the difficulty of keeping control after the brake pedals have been released. There is a risk that the pilot will be misled by the lack of precision between the extent to which the brake pedals are depressed and the sensation perceived during a preceding application of the brakes: if the pilot senses twice the deceleration for a given depression of the pedal, it is tempting to move the pedals repeatedly in order to keep control of braking, and this will have a direct effect on passenger comfort.

The technological background of the invention is also illustrated by the following documents: U.S. Pat. No. 4,365,847, U.S. Pat. No. 3,504,248, U.S. Pat. No. 5,116,108, and U.S. Pat. No. 5,116,109.

OBJECTS AND SUMMARY OF THE INVENTION

An aim of the invention is to devise a braking technique that avoids the drawbacks and/or limitations of the above-mentioned techniques.

Thus, an object of the invention is to provide a method of controlling an electrohydraulic braking apparatus, and to provide an associated apparatus for implementing the method, thereby enabling the controllability of aircraft braking to be improved at low speed and for low desired deceleration, but without that putting any limit on braking performance when maximum braking is desired.

Another object of the invention is to provide a control method and apparatus particularly well suited to alternating braking on groups of wheels at taxiing speeds, with accuracy that is repetitive for the pilot as a function of the extent to which the brake pedals are depressed, and providing optimum comfort for passengers while such alternating braking is being implemented.

More particularly, the present invention provides a method of controlling an electrohydraulic braking apparatus for an aircraft wheel set, in which each wheel is fitted with a brake that is actuated from brake pedals by means of a servo-valve that is electrically controlled by a control unit which measures information corresponding to the depression of said pedals, consisting, while the aircraft is taxiing, in separately organizing braking for the wheels in a first group of wheels comprising half of the wheels in question and for the wheels of a second set of wheels comprising the other half of the wheels in question, braking being performed in compliance with a relationship between pressure applied as a function of brake pedal depression that is specific to each group of wheels, in which a first braking relationship is a continuous increasing function that causes a braking torque to be applied from a low value of pedal depression, and a second braking relationship which is a continuously increasing function that gives rise to braking torque only from a predetermined threshold of pedal depression, said first and second relationships acting over the entire active range of brake pedal depression and being selected in such a manner as to ensure the same applied pressure at maximum brake pedal depression.

Preferably, the first and second braking relationships are identical from a predetermined high value of brake pedal depression up to maximum depression of said pedals. This makes it possible to be sure, as from said depression, that all of the brakes in both groups are being fed with the same pressure.

It is then advantageous for the predetermined high value to be selected so that the corresponding applied pressure is less than a mean threshold pressure of antiskid members associated with the brakes. This improves the chances of having equal pressure on all of the brakes in the entire range over which the anti-skid members operate.

According to another advantageous characteristic, the first and second braking relationships are constituted by one or more slopes.

It is also advantageous for braking relationship allocation to be automatically alternated between the two groups of wheels each time the brake pedals are released from an amount of depression that is less than a predetermined low value, such that the braking applied to each group of wheels is organized alternately in application of one or the other of the two braking relationships.

When the method is a method for use in controlling the braking of two subsets each comprising a plurality of pairs of wheels disposed on either side of a longitudinal midplane of the aircraft, it is also advantageous for each group of wheels to comprise one wheel in each pair for one subset, and the wheels of the other subset that are symmetrical thereto about the said longitudinal plane.

The invention also provides an apparatus for implementing a control method that presents at least one of the above characteristics, including hydraulic generator and an associated electrically controlled valve for feeding a hydraulic circuit to which servo-valves are connected, a control unit which measures information given by an associated sensor corresponding to the degree of brake pedal depression and which electrically controls the above-mentioned servo-valves, with each of said servo-valves feeding a respective brake in one of two groups of brakes, and being controlled by the above-mentioned control unit in application of a predetermined braking relationship which is specific to each group of wheels, as a function of the degree to which the brake pedals are depressed.

Preferably, the control unit includes control means enabling the allocation of a braking relationship to one and the other of the groups of wheels to be alternated automatically each time the brake pedals are released from a degree of depression that is less than a predetermined low value.

BRIEF DESCRIPTION OF THE DRAWINGS

Other characteristics and advantages of the invention appear more clearly in the light of the following description and the accompanying drawings which relate to a particular implementation, and in which:

FIG. 1 is a diagram of a wheel set having eight wheels and fitted with a braking apparatus that is controlled in accordance with the invention;

FIG. 2 is a graph showing two braking relationships used in accordance with the invention, showing how the pressure applied to each of the two groups of wheel brakes varies as a function of the extent to which the brake pedals are depressed, together with the resulting mean overall pressure;

FIG. 3 is a graph showing a more elaborate variant of the two braking relationships, and in particular the two relationships have identical characteristics beyond a given high value of brake pedal depression; and FIG. 4 is a diagram analogous to FIG. 1 for a wheel set having twelve wheels, with the braking thereof being controlled in analogous manner.

MORE DETAILED DESCRIPTION

FIG. 1 is a diagram of an aircraft wheel set having eight wheels referenced R1 to R8, with each of the wheels being fitted with a respective brake F1 to F8, which brakes are usually carbon disk brakes. Electrohydraulic braking is used whereby each wheel brake is actuated by an associated servo-valve given a respective reference SV1 to SV8, which valve is electrically controlled by a control unit 10 that measures information corresponding to the depression of the brake pedals of the aircraft. The servo-valves are thus controlled as a function of brake pedal depression (there are generally two pedals), and this is represented diagrammatically herein by one such brake pedal 11 together with an associated depression sensor 12 which transforms the angle of inclination of the brake pedal, i.e. the extent to which it is depressed, into an electrical signal which is processed in the control unit 10. Each of the servo-valves SV1 to SV8 is fed with fluid by a hydraulic circuit 15 that is organized so that all of the servo-valves are fed simultaneously at the maximum pressure given by a hydraulic generator 13 of the aircraft, whenever an associated master electrically controlled valve 14 is opened. Each of the servo-valves SV1 to SV8 is electrically controlled by the control unit 10, and more precisely by the computer in said unit.

According to a characteristic of the invention, the control unit 10 is organized to apply continuous orders to each of the servo-valves SV1 to SV8, in application of one or the other of two different braking relationships represented herein by graphs L1 and L2, each of which acts over the entire active range of brake pedal depression, providing the aircraft is taxiing (i.e. running on the ground at a low speed, which generally means a speed that is not greater than 70 km/h or 80 km/h).

The set of eight wheels may be divided into two groups of wheels, and the control method of the invention consists in organizing braking for the wheels Ri in a first wheel group comprising half of the wheels concerned separately from the braking of the wheels Rj of a second group of wheels constituting the other half of the wheels concerned, with the brakes being controlled by applying a pressure that varies as a function of the extent to which the brake pedals 11 are depressed, the function applied being specific to each group of wheels. FIG. 1 shows a symmetrical distribution (relative to the longitudinal midplane of the aircraft) which favors retention of good steerability and which reduces the twisting forces applied to the landing gear. In this distribution, the index i applicable to the wheels of the first group takes the values 1, 4, 6, and 7, whereas the index j for the wheels of the second group takes the values 2, 3, 5, and 8. Naturally, the groups of wheels could be organized differently, providing the above-mentioned symmetry is maintained: for example, another possible grouping would be to select the values 1, 2, 3, and 4 for the index i and the values 5, 6, 7, and 8 for the index j, such grouping being particularly favorable when it is desired to minimize applied twisting forces.

The first braking relationship L1 is a continuous increasing function that defines some braking torque even from a small value of brake pedal depression, whereas the second relationship L2 is a continuously increasing function that defines any braking torque only above a predetermined depression threshold for said pedals 11. In addition, the two braking relationships L1 and L2 are selected so as to cause the same pressure to be applied when the brake pedals 11 are maximally depressed.

This makes it possible to increase considerably the accuracy with which the aircraft is braked at low speed and when low deceleration is desired, because of the accurate reproduction of an overall braking relationship that is repetitive and that causes the position of the brake pedals to correspond to the deceleration of the aircraft, even when the speed of the aircraft is low and the desired deceleration is low. When only small amounts of deceleration are desired, braking pressure can be limited on a given group of brakes, while medium and controllable pressures can be generated on the other group of brakes, thereby making it possible to obtain deceleration that is small, but that is controllable at all times. Naturally, when the aircraft is running at high speed, the control unit ensures that both braking relationships are identical over the entire active range of pedal depression, so that all of the wheels of the wheel set are then symmetrically braked in identical manner.

The characteristic of the invention whereby different pressure relationships as a function of brake pedal position are allocated to each group of brakes, with control being provided by the computer of the control unit that also acquires an electrical signal corresponding to brake pedal depression and that applies a braking order to each servo-valve as a function of the braking relationship that is associated therewith, will be better understood on referring to the graph of FIG. 2 which shows two braking relationships suitable for use in accordance with the invention, said graph showing variation in the pressure applied to each of the two groups of wheel brakes as a function of the extent to which the brake pedals are depressed, and also showing the resulting mean overall pressure, it being understood that the aircraft is running at low speed.

The graph of FIG. 2 thus shows how applied pressure P varies as a function of the percentage E to which the brake pedals are depressed. The first curve G1 corresponds to the first braking relationship L1 and it is a continuously increasing function that gives rise to some braking torque starting from a small value E1 of brake pedal depression (in this case, the small value is shown as being non-zero in order to obtain better accuracy). The braking pressure derived in this way gives rise to a braking torque that may be of the order of 15%, starting from said value E1, and some braking torque is obtained as from the moment when the applied pressure exceeds a predetermined threshold $P_0$ which is a function of the type of brake used (this pressure threshold is generally around 10 to $15 \times 10^5$ Pa). In the graph of FIG. 2, the curve G1 associated with the first braking relationship L1 is shown as being a continuous line running from a point A10 that marks the beginning of braking actuation to a point A11 corresponding to maximum depression E2 of the brake pedals (where E2 may be close to 95%, for example). The curve G2 associated with the second braking relationship L2 corresponds to a continuously increasing function that gives rise to no braking torque below a predetermined depression threshold Es of the brake pedals. The curve G2 (drawn in dashed lines) connects the origin to a point A20 that corresponds to the minimum pressure $P_0$ for the predetermined depression threshold Es, by means of a segment having a small constant value (as shown herein) or, in a variant, by means of a segment that increases uniformly from the depression value E1 up to point A20 (i.e. a slope). Thereafter, the curve G1 connects the point A20 to a point A21 which corresponds to maximum depression E2 of the brake pedals, said point A21 essentially coinciding with the above-mentioned point A11 such that the pilot applies the same pressure to both groups at maximum depression of the brake pedals. As an indication, a threshold value Es could be selected that is about 60% to 65%. The curve GM corresponds to the mean overall applied pressure, and this curve (in dot-dashed lines) is constituted by two rectilinear portions that connect the point A10 to an intermediate point AMS, and that then connect said point AMS to a point A11 or A21. It will be seen that the curve GM is a continuous function having no discontinuity in applied pressure (and thus no discontinuity in braking torque) on passing through the threshold value Es.

Thus, so long as the pedals are depressed to an amount below the threshold Es, then one of the groups of wheels is braked using an applied pressure that corresponds to the associated degree of depression, while the other group of wheels is not braked.

It may also be advantageous to make provision for the braking relationship to be allocated automatically in alternation to each of the two groups of wheels Ri and Rj in turn, with changeover occurring each time the brake pedals 11 are released from a low value of pedal depression, such that the braking of each group of wheels is organized to alternate between the two braking relationships L1 and L2. This alternation in braking relationship is particularly advantageous at low speeds for controlling the maneuverability of the aircraft. Under such circumstances, it is preferable to ensure that the alternation in braking relationship allocation takes place only when the brake pedals are released from a depression value that is less than a predetermined low value, which value is selected to be close to E1 (i.e. in general 15% to 20%, depending on the type of brake used).

FIG. 1 is a diagram showing this principle applied to a wheel set constituted by two subsets of pairs of wheels disposed on either side of a longitudinal midplane of the aircraft with the wheels in one of the groups being shown shaded, and it can be seen that each group of wheels Ri and Rj comprises one wheel in each pair for one subset, and the wheels of the other subset which are disposed symmetrically thereto about the longitudinal plane. The control unit 10 then preferably includes control means (not shown) for automatically alternating the braking relationships L1 and L2 between the two groups of wheels Ri and Rj on each occasion that the brake pedals 11 are released, said control means nevertheless taking effect only when the brake pedals are released after being depressed to no more than a predetermined small amount.

The graph of FIG. 2 is given purely by way of example to show how each of the servo-valves SVi, SVj feeding a respective brake in one or other of the groups Fi, Fj is controlled by the control unit 10 in application of a predetermined braking relationship L1 or L2 that is specific to each of the groups of wheels Ri, Rj, and as a function of brake pedal depression. In FIG. 2, each of the curves G1 and G2 is constituted by a single slope, such that the curve showing the corresponding mean overall pressure (GM) is constituted by two successive slopes. The curve GM is a continuous function over the entire range of brake pedal depression, i.e. any discontinuity on going through the threshold value Es has been eliminated by this technique, and this applies both during an increase in the applied pressure and during a decrease in the applied pressure, such that not only is the braking action progressive, but it is also reversible when the pilot releases the brake pedals. This reversibility in braking effect constitutes a very considerable advantage insofar as the pilot has a single reference point, observing the same deceleration for the same amount of brake pedal depression, thereby greatly easing the strain on the pilot who is no longer tempted to jab the brake pedals repeatedly in an attempt to compensate for the effect of discontinuity on passing through the threshold value. Such deceleration that exhibits no hysteresis relative to brake pedal depression constitutes a very significant practical advantage that could not be obtained with the above-mentioned prior techniques.

The curves shown in FIG. 2 are, in fact, representative of two linear relationships giving rise to braking action that may appear to be somewhat rudimentary. It can be seen that for an applied pressure value of $P_A$ that corresponds to a threshold average for the anti-skid means conventionally associated with the wheel brakes, the associated points A12 and A22 correspond to different degrees of brake pedal depression: as a result, when the pilot depresses the brake pedals and approaches the threshold Es, the pressure applied to the first group of brakes reaches the value $P_A$, thereby triggering the associated anti-skid members, while the wheels in the other group are still not braked at all, and this may give rise to a certain amount of unease in the sensation of braking. Another drawbacks lies in the fact that the curves made up from two braking relationships coincide only when the brake pedals are depressed fully: this means that for most given desired high values of deceleration, the pressures applied will be significantly different in the two groups of wheel brakes.

That is why FIG. 3 shows a different variant for the braking relationships, in which both of the above drawbacks can be eliminated.

The curve G1 (continuous lines) associated with the first braking relationship is now constituted by two slopes, namely a first slope connecting the point A10 of the above curve to a point A13 corresponding to a predetermined high value E3 of brake pedal depression, followed by a slope connecting said point A13 to above point A11. Curve G2 (in dashed lines) shows that the second braking relationship applies significant braking torque only above the depression threshold Es, i.e. beyond point A20, with either a low constant value or a uniformly increasing value being applied prior to said point A20 (for example the curves may comprise a slope running from depression value E1). Here again the curve has two slopes, namely: a first slope connecting the point A20 to a point A23 which coincides as closely as possible with above-specified point A13, and a second slope connecting said point A23 to the point A21 which essentially coincides with the point A11. In this case, for any depression greater than the predetermined high value E3 (e.g. corresponding to 80%), the first and second braking relationships L1 and L2 are identical and continue to be identical up to maximum depression of the brake pedals. All of the brakes are then fed with the same pressure, as is the case for braking that is applied while the aircraft is running at a high speed, thereby conferring considerable safety and a very considerable feeling of comfort both for the pilot and for the passengers. This prevents any unbalance in braking between the two groups of brakes, while still retaining the possibility of organizing the way in which braking relationships are allocated to alternate each time the brake pedals are released after they have been depressed by an amount that is less than a predetermined low value, e.g. a value close to E1. The graph showing the corresponding mean overall pressure GM (in dot-dashed lines) now comprises three successive slopes connecting point A10 to a point AMS (which corresponds to depression threshold Es), the point AMS to point A23 or A13, and finally the point A23 to the point A21 or A11. Here again, all three successive slopes run in to one another without there being any discontinuity on passing through a transition value. Naturally, it is advantageous to select braking relationships in such a manner that the applied pressure corresponding to the predetermined high depression value E3 (above which the applied pressure is the same for both groups of wheel brakes) is slightly less than a mean threshold value $P_A$ of the anti-skid members associated with the wheel brakes. Thus, the anti-skid members do not have any effect until after the brake pedal depression threshold E3 has been exceeded; i.e. they come into effect in a zone where the applied pressure is the same for both groups of wheel brakes.

Naturally, the control method of the invention and the associated apparatus for implementation thereof may be designed for wheel sets having a number of wheels other than eight, providing the total number of wheels is even so as to enable them to be divided into two groups of wheels having the same number of wheels in each group, said two groups preferably being organized symmetrically about the longitudinal midplane of the aircraft.

Thus, FIG. 4 constitutes a diagram analogous to FIG. 1, but applicable to a set of twelve wheels, with braking of the wheels being controlled in a manner analogous to that described above.

Thus, FIG. 4 shows twelve wheels referenced R1 to R12, associated with brakes F1 to F12 controlled by servo-valves SV1 to SV12 that are themselves electrically controlled by the control unit 10. For greater clarity, the wheels of a first group of wheels Ri are shaded, with the index i takes the values 1, 4, 5, 8, 10, and 11, while the wheels Rj of the other group of wheels are not shaded, with the index j taking the values 2, 3, 6, 7, 9, and 12.

Here again, braking can be organized in such a manner that the two braking relationships are automatically allocated in alternation between the two groups of wheels each time the brake pedals are released after being depressed to an amount that is less than a predetermined low value, thus enabling one group of wheels to be braked alternately in application of braking relationship L1 and of relationship L2, with this taking place over the entire active range of brake pedal depression. It may be observed that the two groups of wheels have been selected in this case in application of the same rule concerning symmetry about the longitudinal midplane of the aircraft.

The invention is not limited to the embodiments described above, but on the contrary extends to any variant that uses equivalent means to reproduce the essential characteristics specified above.

I claim:

1. A method of controlling an electrohydraulic braking apparatus for an aircraft wheel set, in which each wheel is fitted with a brake that is actuated from brake pedals by means of a servo-valve that is electrically controlled by a control unit which measures information corresponding to the depression of said pedals, consisting, while the aircraft is taxiing, in separately organizing braking for the wheels in a first group of wheels comprising half of the wheels of said aircraft wheel set and for the wheels of a second group of wheels comprising the other half of the wheels of said aircraft wheel set, said braking being performed in compliance with one of two different relationships between pressure applied as a function of brake pedal depression that is specific respectively to each group of wheels, wherein a first braking relationship is a continuous increasing function that causes a braking torque to be applied from a low value of pedal depression, and a second braking relationship which is a continuously increasing function that gives rise to braking torque only from a predetermined threshold of pedal depression, with said predetermined threshold being substantially greater than said low value of pedal depression, said first and second relationships acting over the entire active range of brake pedal depression and being selected in such a manner as to ensure the same applied pressure at maximum brake pedal depression.

2. A control method according to claim 1, wherein the first and second braking relationships are identical from a predetermined high value of brake pedal depression up to maximum depression of said pedals, said predetermined high value being higher than said predetermined threshold of pedal depression.

3. A control method according to claim 2, wherein the predetermined high value is selected so that the corresponding applied pressure is less than a mean threshold pressure of anti-skid members associated with the brakes.

4. A control method according to claim 1, wherein the first and second braking relationships are constituted by one or more slopes.

5. A control method according to claim 1, wherein braking relationship allocation is automatically alternated between the two groups of wheels each time the brake pedals are released from an amount of depression that is less than a predetermined low value, such that the braking applied to each group of wheels is organized alternately in application of one or the other of the two braking relationships.

6. A control method according to claim 1, for use in controlling the braking of two subsets each comprising a plurality of pairs of wheels disposed on either side of a longitudinal midplane of the aircraft, wherein each group of wheels comprises one wheel in each pair for one subset, and the wheels of the other subset that are symmetrical thereto about the said longitudinal plane.

7. An apparatus for controlling electrohydraulic brakes including a hydraulic generator and an associated electrically controlled valve for feeding a hydraulic circuit to which servo-valves are connected, a control unit for measuring information given by an associated sensor corresponding to the degree of brake pedal depression and which electrically controls said servo-valves, with each of said servo-valves feeding a respective brake in one of two groups of brakes, and being controlled by said control unit in application of one of two predetermined different braking relationships which is specific to each group of wheels, as a function of the degree to which the brake pedals are depressed, with one relationship causing a braking torque to be applied to one group of brakes from a low value of pedal depression and the other relationship causing a braking torque to be applied to the other group of brakes from a predetermined threshold of pedal depression that is substantially greater than said low value of pedal depression.

8. An apparatus according to claim 7, wherein the control unit includes control means enabling the allocation of a braking relationship to one and the other of the groups of wheels to be alternated automatically each time the brake pedals are released from a degree of depression that is less than a predetermined low value.

* * * * *